(12) United States Patent
Yeager et al.

(10) Patent No.: US 8,948,932 B2
(45) Date of Patent: Feb. 3, 2015

(54) UNMANNED VEHICLE ROUTE MANAGEMENT SYSTEM

(75) Inventors: Matthew R. Yeager, Centreville, VA (US); Christopher J. Graham, Bethesda, MD (US); John A. Wheeler, Centreville, VA (US)

(73) Assignee: Raytheon Company, Waltham, MA (US)

( * ) Notice: Subject to any disclaimer, the term of this patent is extended or adjusted under 35 U.S.C. 154(b) by 1239 days.

(21) Appl. No.: 11/929,555

(22) Filed: Oct. 30, 2007

(65) Prior Publication Data
US 2010/0070124 A1    Mar. 18, 2010

(51) Int. Cl.
G05D 1/00 (2006.01)
B64C 39/02 (2006.01)
G01C 21/00 (2006.01)
B64C 13/00 (2006.01)

(52) U.S. Cl.
CPC ................. G05D 1/0022 (2013.01)
USPC .......................................................... 701/3

(58) Field of Classification Search
USPC .......................................................... 701/25
See application file for complete search history.

(56) References Cited

U.S. PATENT DOCUMENTS 5,155,683 A    10/1992   Rahim ............... 364/424.02
2007/0018052 A1*  1/2007   Eriksson ................ 244/190

FOREIGN PATENT DOCUMENTS

EP    1 612 632 A1    1/2006    ............ G05D 1/10
WO    WO-2009/058697 A1    5/2009

OTHER PUBLICATIONS

PCT Notification of Transmittal of the International Search Report and the Written Opinion of the International Searching Authority, or the Declaration, re PCT/US 2008/081247 (16 pages), Mar. 24, 2009.
Pedersen, Jorgen, "A Practical View and Future Look at JAUS," RE2, Inc, www.resquared.com/pdfs/060510A-Jaus-White-Paper. pdf., retrieved Mar. 12, 2009 (9 pages), May 31, 2006.
Santamaria, Eduard, et al., "Increasing UAV Capabilities Through Autopilot and Flight Plan Abstraction," Digital Avionics System Conference, 2007 (10 pages), Oct. 1, 2007.
"Canadian Application Serial No. 2,702,426, Office Action mailed Apr. 9, 2014", 3 pgs.
"Canadian Application Serial No. 2,702,426, Office Action mailed May 15, 2012", 2 pgs.
"Chinese Application Serial No. 200880114258.7, Response filed May 2, 2012 to Office Action mailed Dec. 14, 2011", (w/ English Translation of Amended Claims), 17 pgs.

(Continued)

Primary Examiner — Khoi Tran
Assistant Examiner — Dale Moyer
(74) Attorney, Agent, or Firm — Schwegman Lundberg & Woessner, P.A.

(57) ABSTRACT

According to one embodiment, a route management system for an unmanned vehicle includes a network node in communication with an unmanned vehicle control system and an unmanned vehicle. The network node is operable to transmit a number of initial waypoints to the unmanned vehicle, transmit one or more in-flight waypoints to the unmanned vehicle after the unmanned vehicle has arrived at a corresponding one or more of the initial waypoints, and replace the one or more of the initial waypoints with the one or more in-flight waypoints in the unmanned vehicle such that the total quantity waypoints stored in the unmanned vehicle does not exceed a specified quantity.

20 Claims, 4 Drawing Sheets

(56) References Cited

OTHER PUBLICATIONS

"European Application Serial No. 08845282.6, Amendment filed May 6, 2010", 6 pgs.
"European Application Serial No. 08845282.6, Office Action mailed May 10, 2012", 5 pgs.
"European Application Serial No. 08845282.6, Office Action mailed Jun. 10, 2010", 2 pgs.
"European Application Serial No. 08845282,6, Response filed Jul. 20, 2010 to Office Action mailed Jun. 10, 2010", 20 pgs.
"International Application Serial No. PCT/US2008/081247, International Preliminary Report on Patentability dated May 4, 2010", 7 pgs.
"Chinese Application Serial No. 200880114258.7, Response filed Jan. 26, 2014 to Office Action mailed Dec. 18, 2013", (w/ Translation of Amended Claims), 11 pgs.
"Australian Application Serial No. 2008318929, Office Action mailed Mar. 23, 2012", 2 pgs.
"Canadian Application Serial No. 2,702,426, Response filed Jul. 10, 2014 to Office Action mailed Apr. 9, 2013", 4 pgs.
"Japanese Application Serial No. 2010-531307, Office Action mailed Jul. 17, 2012", (w/ English Translation), 10 pgs.
"Australian Application Serial No. 2008318929, Notice of Acceptance mailed Jan. 8, 2013", 6 pgs.
"Australian Application Serial No. 2008318929. Response filed Dec. 7, 2012 to Office Action mailed Mar. 23, 2012", 15 pgs.
"Canadian Application Serial No. 2,702,426, Office Action mailed Apr. 9, 2013", 3 pgs.
"Canadian Application Serial No. 2,702,426, Response filed Oct. 3, 2013 to the Examiner's Report dated Apr. 9, 2013", 8 pgs.
"Canadian Application Serial No. 2,702,426, Response filed Oct. 11, 2012 to Office Action mailed May 15, 2012", 13 pgs.
"Chinese Application Serial No. 200880114258,7, Office Action mailed May 16, 2013", (w/ English Translation), 18 pgs.
"Chinese Application Serial No. 200880114258.7, Office Action mailed Oct. 12, 2012", (w/ English Translation), 10 pgs.
"Chinese Application Serial No. 200880114258.7, Office Action mailed Dec. 18, 2013",(w/ English Translation), 7 pgs.
"Chinese Application Serial No. 200880114258,7, Response filed Jan. 26, 2014 to Office Action mailed Dec. 18, 2013", (w/ English Translation of Amended Claims), 11 pgs.
"Chinese Application Serial No. 200880114258.7, Response filed Jul. 26, 2013 to Office Action mailed May 16, 2013", (w/ English Translation of Amended Claims), 13 pgs.
"Chinese Application Serial No. 200880114258.7, Response filed Dec. 27, 2012 to Office Action mailed Oct. 12, 2012", (w/ English Translation of Amended Claims), 15 pgs.
"European Application Serial No. 08845282.6, Examination Notification Art. 94(3) mailed Jul. 17, 2013", 4 pgs.
"European Application Serial No. 08845282.6, Response filed Sep. 6, 2012 to Office Action mailed May 10, 2012", 12 pgs.
"European Application Serial No. 088452828, Response filed Oct. 23, 2013 to Examination Notification Art. 94(3) mailed Jul. 17, 2013", 2 pgs.
"Israel Application Serial No. 205027, Notice of Allowability mailed Dec. 8, 2013", 4 pgs.
"Israel Application Serial No. 205027, Office Action mailed Jul. 1, 2013", (w/ English Summary), 3 pgs.
"Israel Application Serial No. 205027, Office Action mailed Nov. 13, 2012", 1 pg.
"Israel Application Serial No. 205027, Response filed Mar. 12, 2013 to Office Action mailed Nov. 13, 2012", (w/ English Translation of Claims), 5 pgs.
"Israel Application Serial No. 205027, Response filed Oct. 31, 2013 to Office Action mailed Jul. 1, 2013", (w/ English Translation of Amendment), 7 pgs.
"Japanese Application Serial No. 2010-531307, Office Action mailed Jan. 15, 2013", 2 pgs.
"Japanese Application Serial No. 2010-531307, Response filed Feb. 7, 2013 to Office Action mailed Jan. 15, 2013", (w/ English Translation of Claims), 9 pgs.
"Japanese Application Serial No. 2010-531307, Response filed Oct. 15, 2012 to Office Action mailed Jul. 17, 2012", (w/ English Translation of Claims), 11 pgs.
"Chinese Application Serial No. 200880114258.7, Office Action mailed Dec. 14, 2011", 7 pgs.

* cited by examiner

UNMANNED VEHICLE ROUTE MANAGEMENT SYSTEM

TECHNICAL FIELD OF THE DISCLOSURE

This disclosure generally relates to unmanned vehicles, and more particularly, to an unmanned vehicle route management system and method of operating the same.

BACKGROUND OF THE DISCLOSURE

An unmanned vehicle generally refers to a type of vehicle that is configured to operate without an onboard pilot or driver. Control of the unmanned vehicle may be provided by a remotely configured vehicle control system that transmits commands to the unmanned vehicle for manipulating the unmanned vehicle's operation. The vehicle control system may receive visual or various types of telemetry information from the unmanned vehicle to enable responsive actions from the vehicle control system by a human user. Unmanned vehicles that travel through the air are generally referred to as unmanned aerial vehicles (UAVs) and those that travel over the ground or water are generally referred to unmanned surface vehicles (USVs).

SUMMARY OF THE DISCLOSURE

According to one embodiment, a route management system for an unmanned vehicle includes a network node in communication with an unmanned vehicle control system and an unmanned vehicle. The network node is operable to transmit a number of initial waypoints to the unmanned vehicle, transmit one or more in-flight waypoints to the unmanned vehicle after the unmanned vehicle has arrived at a corresponding one or more of the initial waypoints, and replace the one or more of the initial waypoints with the one or more in-flight waypoints in the unmanned vehicle such that the total quantity waypoints stored in the unmanned vehicle does not exceed a specified quantity.

Some embodiments of the disclosure may provide numerous technical advantages. Some embodiments may benefit from some, none, or all of these advantages. For example, one embodiment of the route management system may enable implementation of routes having a greater number of the waypoints than natively provided by the unmanned vehicle. Known unmanned vehicles are designed to store up to a specified quantity of waypoints. By replacement of previously arrived at waypoints with additional waypoints during flight, the number of waypoints that may be administered to the unmanned vehicle by the unmanned vehicle control system may be extended to virtually any quantity.

Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

To enable communication between the vehicle control system and unmanned vehicle, a number of messaging protocols have been developed. One particular messaging protocol is a STANdardization AGreement (STANAG) 4586 protocol. The STANdardization AGreement 4586 protocol has been developed by the North Atlantic Treaty Organization (NATO) to promote unmanned vehicle interoperability among member nations. Another type of messaging protocol is the joint architecture for unmanned systems (JAUS) developed by the United States Department of Defense. Although numerous unmanned vehicles have been developed for use with both of these protocols, significant variations exist in either messaging protocol such that unmanned vehicles configured for use with one protocol is generally incompatible with a system using the other protocol.

One difference between the two protocols may be the manner in which routes are managed by the vehicle control system. A route generally refers to course or path taken by an unmanned vehicle during any particular mission and may include a number of waypoints that each indicates a particular destination along this course. Unmanned vehicles using a joint architecture for unmanned systems protocol typically utilize relatively fewer waypoints than unmanned vehicles having a STANdardization AGreement 4586 interface and therefore may be unsuitable for use with vehicle control systems using a STANdardization AGreement 4586 protocol. That is, attempts to control a joint architecture for unmanned systems compliant unmanned vehicle using a STANdardization AGreement 4586 compliant vehicle control system may be prohibited due to an excessive quantity of waypoints administered by the vehicle control system.

Figure 1:
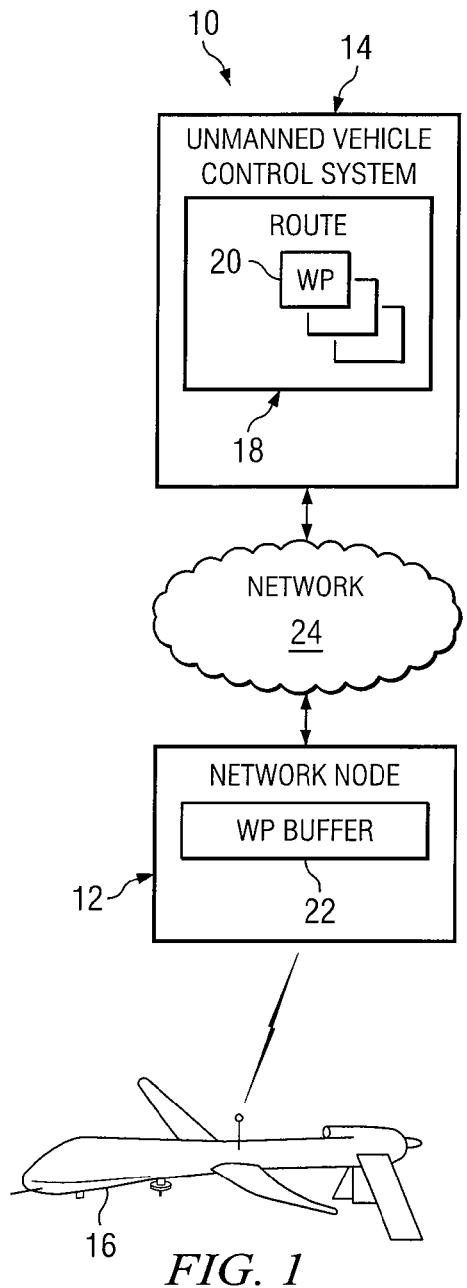
FIG. 1 is a block diagram showing one embodiment of a route management system according to the teachings of the present disclosure.

FIG. 1 shows one embodiment of an unmanned vehicle route management system 10 that may provide a solution to this problem as well as other problems. Unmanned vehicle route management system 10 generally includes a network node 12 coupled to an unmanned vehicle control system 14 and in communication with an unmanned vehicle 16. The unmanned vehicle control system 14 is configured to control the course that unmanned vehicle 16 travels using a route 18 having a number of waypoints 20. As will be described in greater detail below, the network node 12 may incorporate a waypoint buffer 22 for temporarily storing waypoints 20 such that the number of waypoints 20 stored in the unmanned vehicle 16 does not exceed a specified quantity.

Unmanned vehicle control system 14 may be implemented on any suitable computing system that executes program instructions stored in a memory. In one embodiment, unmanned vehicle control system 14 has a STANdardization AGreement 4586 compliant interface in which network 24 is a user datagram protocol (UDP) type network. The unmanned vehicle control system 14 having a STANdardization AGreement 4586 interface may provide a common interface for controlling differing types of unmanned vehicles 16.

The network node 12 may be implemented with a processor executing computer instructions stored in a memory. The network node 12 may incorporate any suitable protocol for communication with the unmanned vehicle control system 14 and the unmanned vehicle 16. In one embodiment, the network node 12 may be implemented as a vehicle specific module (VSM) that communicates with the unmanned vehicle control system 14 using a STANdardization AGreement 4586 compliant protocol. In another embodiment the network node 12 may communicate with the unmanned vehicle control system 14 through a network 24, such as a UDP/IP network.

The network node 12 may communicate with the unmanned vehicle 16 using any suitable wireless protocol. In one embodiment, the protocol used by the unmanned vehicle 16 may be different from the native protocol of the unmanned vehicle control system 14. In another embodiment, the unmanned vehicle 16 may be configured to communicate with the network node 12 using a joint architecture for unmanned systems protocol. The unmanned vehicle 16 using a joint architecture for unmanned systems protocol may be configured to store a specified quantity of waypoints that may be used during any particular mission.

Certain embodiments of a network node 12 incorporating a waypoint buffer 22 may provide an advantage in that unmanned vehicles 16 that are configured to store a specified quantity of waypoints may be able to conduct missions using a greater quantity of waypoints than its specified quantity of waypoints. Because vehicle control systems 14 implemented with a STANdardization AGreement 4586 interface typically manage routes of unmanned vehicles 16 using a greater quantity of waypoints than those using joint architecture for unmanned systems interfaces, unmanned vehicles 16 using a joint architecture for unmanned systems interface may be configured for use with vehicle control systems 14 using the network node 12 with waypoint buffering capability.

Figure 2:
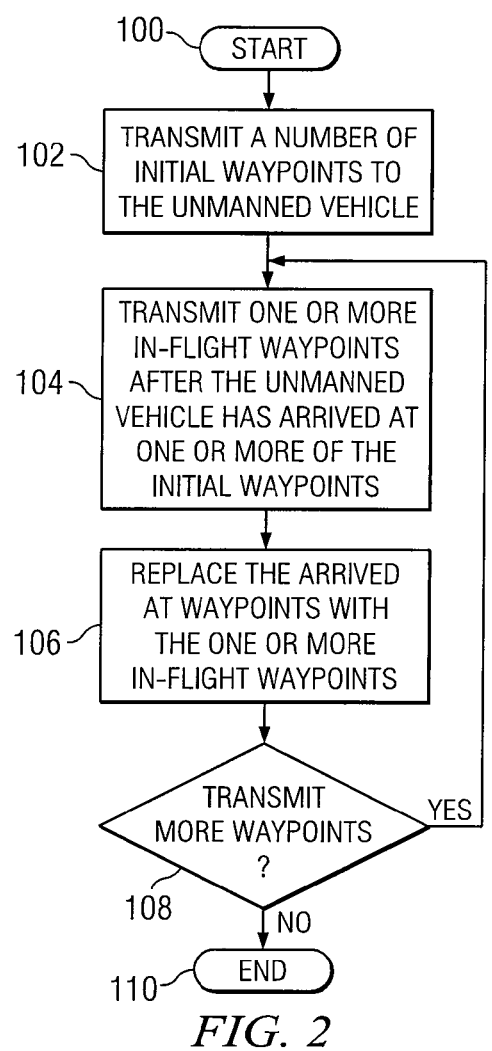
FIG. 2 is a flowchart showing a series of actions that may be performed by the route management system of FIG. 1.

FIG. 2 is a flowchart showing one embodiment of a series of actions that may be taken by the network node 12 to manage a route 18 of unmanned vehicle 16. In act 100, the process is initiated. The process may be initiated by applying power to and performing any pertinent bootstrapping operations to the unmanned vehicle control system 14, network node 12, and unmanned vehicle 16. The network node 12 may also receive a route having a number of waypoints 20 from the unmanned vehicle control system 14 and temporarily store this route 18 in the waypoint buffer 22.

In act 102, the network node 12 may transmit a number of initial waypoints 20 to the unmanned vehicle 16. The waypoints 20 may be an initial portion of a route 18 to be taken by the unmanned vehicle 16 during its mission and may be any quantity that does not exceed the specified quantity of the unmanned vehicle 16.

In act 104, the network node 12 may transmit one or more in-flight waypoints 20 to the unmanned vehicle 16 after the unmanned vehicle 16 has reached a corresponding one or more of the previously transmitted waypoints 20. That is, the in-flight waypoints 20 may be transmitted to the unmanned vehicle 16 while conducting its mission. The number of in-flight waypoints 20 transmitted may be less than or equal to the number of waypoints 20 in which the unmanned vehicle 16 has arrived at since initiation of its mission. In act 106, the unmanned vehicle 16 may replace the previously transmitted waypoints 20 with the in-flight waypoints 20. By replacing waypoints 20 that have been previously arrived at, the total quantity of waypoints 20 temporarily stored in the unmanned vehicle 16 does not exceed its specified quantity.

In act 108, the network node 12 may choose to transmit more waypoints 20 or cease transmitting waypoints 20 to the unmanned vehicle 16. If the network node 12 chooses to tranmit more waypoints 20, processing continues at act 104 in which one or more waypoints 20 are again transmitted to the unmanned vehicle 16 for replacement of previously transmitted waypoints 20. In this manner, the route 18 of the unmanned vehicle 16 may be managed with an indefinite number of waypoints 20. The previously described process continues for the extent of the unmanned vehicle's 16 mission. The mission is complete once the unmanned vehicle 16 reaches the final waypoint 20 transmitted by the network node 12 in which the process is ended in act 110.

Figure 3B:
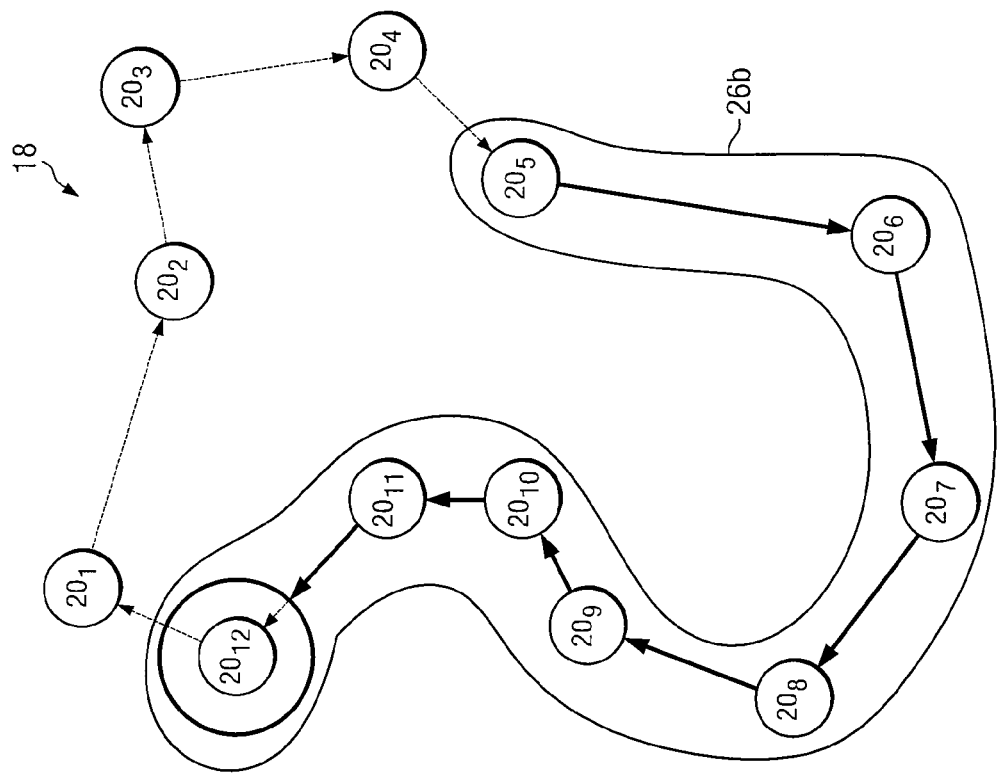
FIGS. 3A through 3C shows one example of a geographical layout of a route that may be managed by the route management system of FIG. 1 in which in-flight waypoints are transmitted to the unmanned vehicle in groups.
Figure 3A:
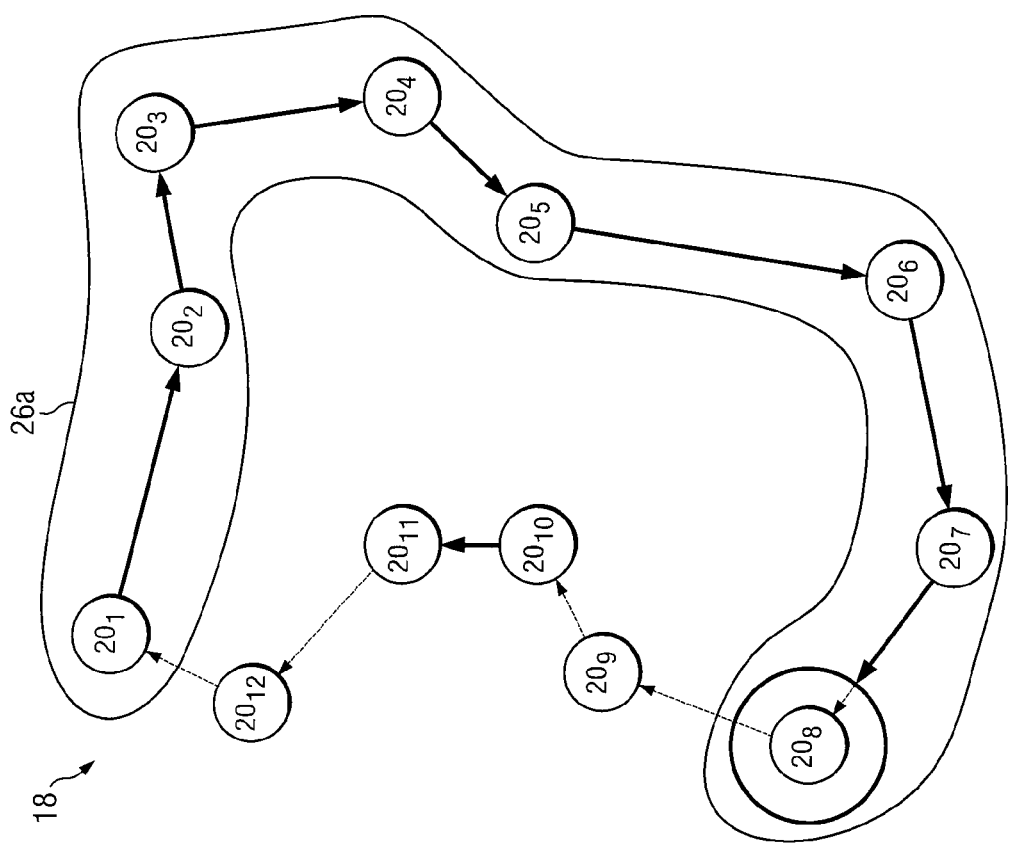
Figure 3C:
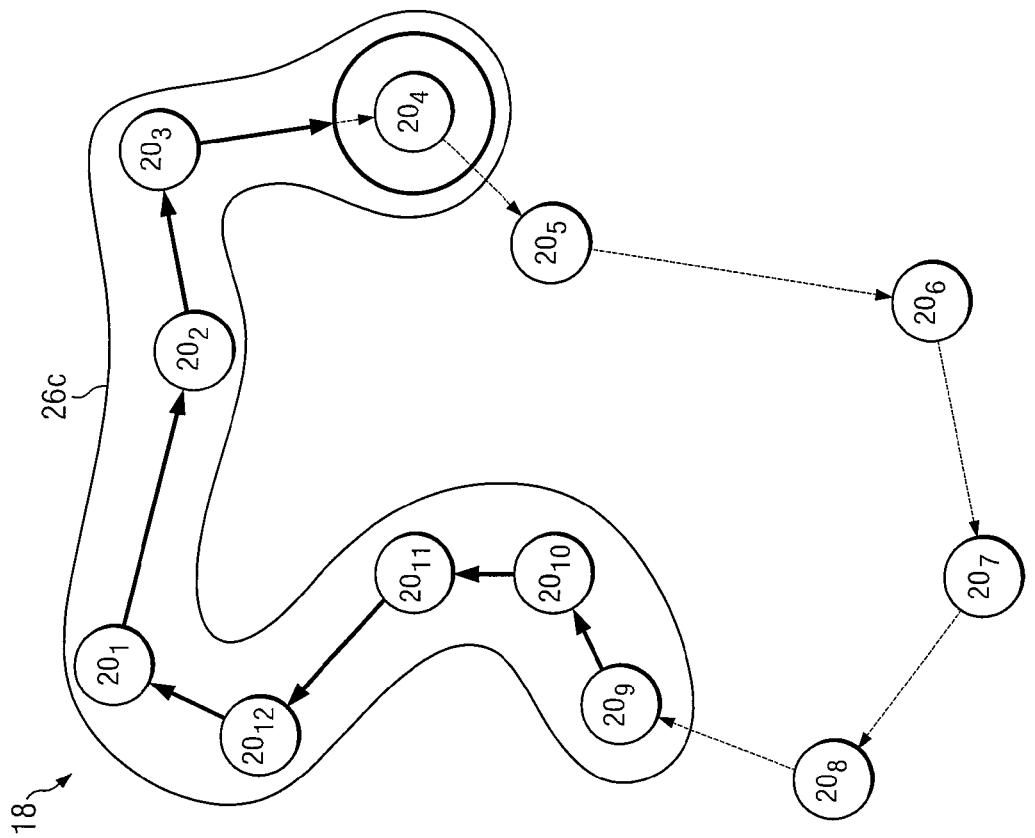

FIGS. 3A through 3C shows one example of a geographical layout of a route 18 that may be managed by the unmanned vehicle control system 14 on the unmanned vehicle 16. This particular route 18 has a quantity of twelve waypoints 20 in which the unmanned vehicle 16 may sequentially travel towards during its mission. The unmanned vehicle 16, however, has a maximum specified quantity of eight waypoints 20 that may be stored at any one time.

As shown in FIG. 3A, waypoints $20_1$ through $20_8$ comprise a group 26a of initial waypoints 20 that may be transmitted to the unmanned vehicle 16 just prior to or shortly after initiation of the unmanned vehicle's 16 mission. In one embodiment, waypoint $20_8$, which is the last in the sequence of the initial waypoints, is a loiter waypoint. A loiter waypoint generally refers to a type of waypoint in which the unmanned vehicle 16 is instructed to remain at until given further instruction by the unmanned vehicle control system 14. For example, the unmanned vehicle 16 may conduct a circling pattern in order to remain at loiter waypoint $20_8$.

Waypoint $20_9$ through waypoint $20_{12}$ indicate other waypoints along the route 18 that are not initially stored in the unmanned vehicle 16 because they would exceed the specified quantity of waypoints in the unmanned vehicle 16. That is, because storage of waypoint $20_9$ through $20_{12}$ in the unmanned vehicle 16 would exceed its specified quantity of waypoints, these waypoints may not be transmitted to the unmanned vehicle simultaneously with the initial waypoints $20_1$ through $20_8$.

In FIG. 3B, waypoints $20_5$ through $20_{12}$ comprise a group 26b of in-flight waypoints that may be transmitted to the unmanned vehicle 16 during its mission. In this figure, waypoints $20_1$ through $20_4$ represent waypoints that have been previously arrived at prior to receipt of the group 26b of in-flight waypoints by the unmanned vehicle 16. Because waypoint $20_1$ through $20_4$ have already been arrived at by the unmanned vehicle 16, they are no longer needed for the mission and may be removed from the unmanned vehicle 16 to accommodate the new waypoints $20_9$ through $20_{12}$.

The group 26b of in-flight waypoints may include new waypoints in addition to recursive waypoints. In this particular embodiment, waypoints $20_9$ through $20_{12}$ are new waypoints in that they have not been previously transmitted to the unmanned vehicle 16. In one embodiment, the network node 12 may also transmit recursive waypoints $20_5$ through $20_8$ to the unmanned vehicle 16. Recursive waypoints generally refer to waypoints 20 transmitted to the unmanned vehicle 16 that have been previously received. Certain embodiments, incorporating the transmission of recursive waypoints 20 may enable enhanced reliability by providing redundant transmission of waypoints 20 along route 18. Thus, occasional network outages or missed transmissions may not unduly impair the ability of the unmanned vehicle 16 to complete its mission.

The unmanned vehicle route management system 10 may enable management of routes 18 having a greater number of waypoints 20 than natively allowed using the specified quantity of the unmanned vehicle 16. In one embodiment, the in-flight waypoints 20 transmitted to the unmanned vehicle 16 may be a sub-route that implements a particular maneuver for the unmanned vehicle 16 to perform. For example, a sub-route may be a particular non-circular loiter pattern, such as a figure-eight loiter pattern or a racetrack loiter pattern to be performed by the unmanned vehicle 16. In other examples, the sub-route may be an approach route that provides a detailed landing trajectory or a vector route that instructs the unmanned vehicle 16 to approach a waypoint 20 from a desired direction.

FIG. 3C shows another group 26c of in-flight waypoints that may be transmitted to the unmanned vehicle 16. This particular group 26c of in-flight waypoints may include waypoints $20_9$ through $20_{12}$ and $20_1$ through $20_4$ such that the unmanned vehicle 16 is instructed to repeatedly travel along the previously defined route 18. These waypoints 20 may be transmitted to the unmanned vehicle 16 at any time after the unmanned vehicle 16 has arrived at waypoint $20_9$ and before the unmanned vehicle 16 is scheduled to arrive at waypoint $20_4$. As can be seen, the unmanned vehicle route management system 10 may manage a route having any number of waypoints 20 on an unmanned vehicle 16 that is configured to store a finite specified quantity of waypoints.

Figure 4A:
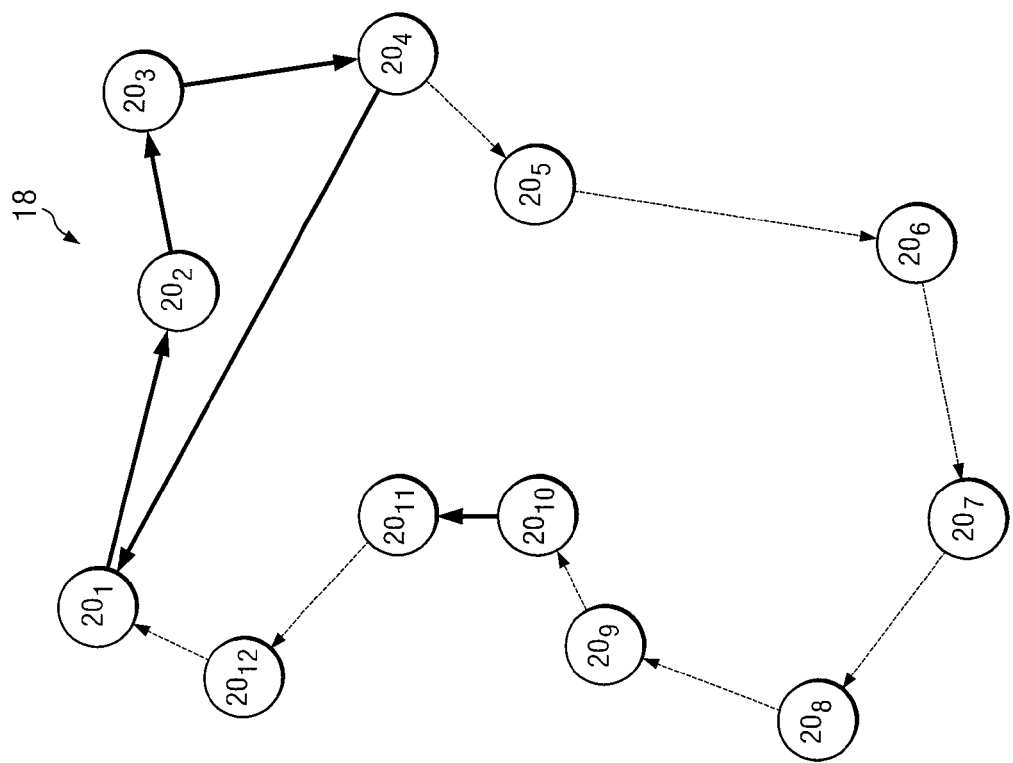
FIGS. 4A through 4C shows another example of a geographical layout of a route that may be managed by the route management system of FIG. 1 in which in-flight waypoints are transmitted to the unmanned vehicle one at a time.
Figure 4C:
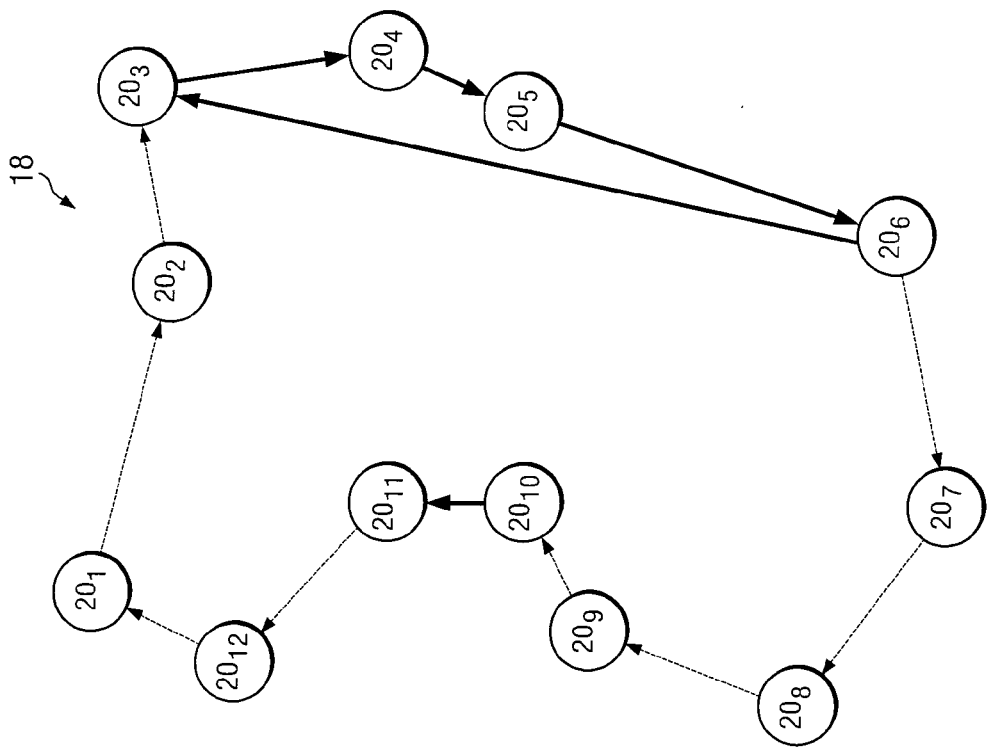
Figure 4B:
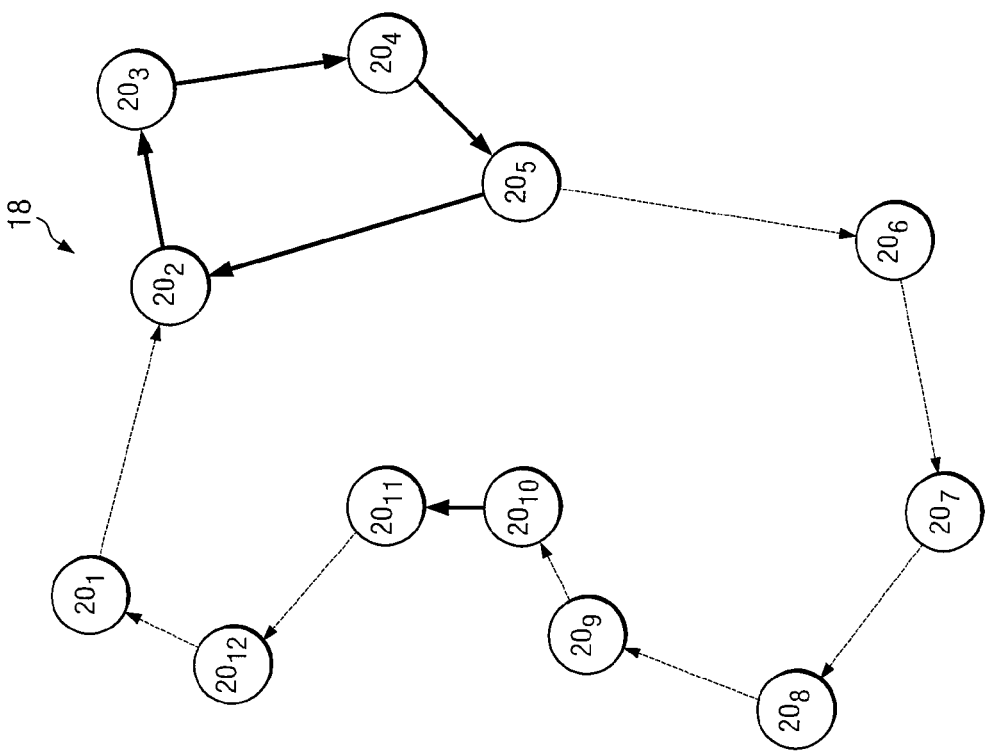

FIGS. 4A through 4C shows another embodiment in which the route 18 may be managed by the network node 12. In this particular embodiment, a single waypoint 20 may be transmitted to the unmanned vehicle 16 following arrival at each subsequent waypoint 20. As described previously, route 18 has twelve waypoints $20_1$ through $20_{12}$ that each indicate twelve corresponding locations to be sequentially arrived at by the unmanned vehicle 16 and the unmanned vehicle 16 has a specified quantity of four waypoints 20 that may be stored at any one time. In FIG. 4A, waypoints $20_1$ through $20_4$ comprise a number of initial waypoints 20 that may be transmitted to the unmanned vehicle 16 just prior to or shortly after initiation of the unmanned vehicle's 16 mission.

In FIG. 4B, the unmanned vehicle 16 has previously arrived at waypoint $20_1$ in which this particular waypoint is no longer needed. Thus, the network node 12 may transmit a new waypoint $20_5$ to the unmanned vehicle 16 that subsequently replaces waypoint $20_1$. In one embodiment, waypoint $20_5$ may be transmitted to the unmanned vehicle 16 at any time between arrival of the unmanned vehicle 16 at waypoints $20_1$ through $20_4$.

In FIG. 4C, the unmanned vehicle 16 has previously arrived at waypoint $20_2$. That is, the unmanned vehicle 16 may be progressing towards either waypoints $20_3$, waypoint $20_4$, or waypoint $20_5$. In this scenario, the network node 12 may then transmit waypoint $20_6$ to the unmanned vehicle 16 such that waypoint $20_2$ is replaced with waypoint $20_6$. The previously described process may continue until all twelve waypoints 20 are arrived at by the unmanned vehicle 16.

A unmanned vehicle route management system 10 has been described that may enable enhanced route management by network node 12. In one embodiment, the network node 12 may be a vehicle specific module configured in a STANdardization AGreement 4586 compliant unmanned vehicle control system 14 that is operable to administer the transmission and receipt of messages to and from the unmanned vehicle 16. Using the unmanned vehicle route management system 10, a STANdardization AGreement 4586 compliant unmanned vehicle control system 14 may be operable to manage routes 18 of unmanned vehicles that communicate using other protocols, such as the joint architecture for unmanned systems protocol.

Although several embodiments have been illustrated and described in detail, it will be recognized that substitutions and alterations are possible without departing from the spirit and scope of the present disclosure, as defined by the following claims.

What is claimed is:

1. A route management system comprising:
a vehicle control system including a Standardization Agreement 4586 compliant interface configured to communicate a route using a first quantity of waypoints; and
a vehicle specific module in communication with the vehicle control system and an unmanned vehicle including a joint architecture for unmanned systems compliant interface that is configured to interpret a specified quantity of waypoints to control travel of the unmanned vehicle, wherein the specified quantity of waypoints is smaller than the first quantity of waypoints, the vehicle specific module operable to:
transmit, according to a first sequence, a plurality of initial waypoints of the first quantity of waypoints to the unmanned vehicle, the plurality of initial waypoints comprising a portion of the route;
transmit, according to a second sequence following the first sequence, one or more in-flight waypoints of the first quantity of waypoints to the unmanned vehicle after the unmanned vehicle has arrived at one or more of the plurality of initial waypoints; and
replace, according to the first sequence, one or more of the plurality of initial waypoints with the one or more in-flight waypoints in the unmanned vehicle,
wherein a quantity of the plurality of initial waypoints and the one or more in-flight waypoints stored in the unmanned vehicle each do not exceed the specified quantity.

2. The route management system of claim 1, wherein the one or more waypoints is a single waypoint.

3. The route management system of claim 1, wherein the one or more waypoints is a group of in-flight waypoints comprising one or more new waypoints and one or more recursive waypoints, the one or more new waypoints including a quantity that is less than the quantity of the plurality of initial waypoints in which the unmanned vehicle has previously arrived.

4. The route management system of claim 3, wherein the group of in-flight waypoints is a sub-route.

5. The route management system of claim 4, wherein the sub-route is at least one of an approach route, a loiter route, and a vector route.

6. A route management system comprising:
a network node in communication with an unmanned vehicle control system and an unmanned vehicle that includes an interface that is configured to interpret a specified quantity of waypoints to control travel along a route, the network node being operable to:
receive a first quantity of waypoints that is larger than the specified quantity of waypoints;
transmit, according to a first sequence, a plurality of initial waypoints of the first quantity of waypoints to the unmanned vehicle, the plurality of initial waypoints comprising a portion of a route by which the unmanned vehicle travels;
transmit, according to a second sequence following the first sequence, one or more in-flight waypoints of the first quantity of waypoints to the unmanned vehicle after the unmanned vehicle has arrived at one or more of the plurality of initial waypoints; and
replace, according to the first sequence, one or more of the plurality of initial waypoints with the one or more in-flight waypoints in the unmanned vehicle, wherein the quantity of the plurality of initial waypoints and the one or more in-flight waypoints stored in the unmanned vehicle each do not exceed the specified quantity.

7. The route management system of claim 6, wherein the one or more waypoints is a single waypoint.

8. The route management system of claim 7, wherein the group of in-flight waypoints is a sub-route.

9. The route management system of claim 8, wherein the sub-route is at least one of an approach route, a loiter route, and a vector route.

10. The route management system of claim 7, wherein a final waypoint of the group of in-flight waypoints is a loiter waypoint.

11. The route management system of claim 6, wherein the one or more waypoints is a group of in-flight waypoints comprising one or more new waypoints and one or more recursive waypoints, the one or more new waypoints including a quantity that is less than or equal to the quantity of the plurality of initial waypoints in which the unmanned vehicle has previously arrived.

12. The route management system of claim 6, wherein the network node is a vehicle specific module and operable to receive the plurality of initial waypoints and the one or more in-flight waypoints from the unmanned vehicle control system using a Standardization Agreement 4586 protocol.

13. The route management system of claim 6, wherein the network node is configured to transmit the plurality of initial waypoints and the one or more in-flight waypoints using a joint architecture for unmanned systems protocol.

14. A method comprising:
  receiving a first quantity of waypoints that is larger than a specified quantity of waypoints;
  transmitting, according to a first sequence, a plurality of initial waypoints of the first quantity of waypoints to an unmanned vehicle, the plurality of initial waypoints comprising a portion of a route by which the unmanned vehicle travels;
  transmitting, according to a second sequence following the first sequence, one or more in-flight waypoints of the first quantity of waypoints to the unmanned vehicle after the unmanned vehicle has arrived at one or more of the plurality of initial waypoints; and
  replacing, according to the first sequence, the one or more of the plurality of initial waypoints from the unmanned vehicle with the one or more in-flight waypoints,
  wherein the quantity of waypoints stored in the unmanned vehicle does not exceed the specified quantity at a time.

15. The method of claim 14, wherein transmitting one or more in-flight waypoints to the unmanned vehicle after the unmanned vehicle has arrived at one or more of the plurality of initial waypoints further comprises transmitting one in-flight waypoint to the unmanned vehicle after the unmanned vehicle has arrived at one of the plurality of initial waypoints.

16. The method of claim 14, wherein transmitting one or more in-flight waypoints to the unmanned vehicle after the unmanned vehicle has arrived at one or more of the plurality of initial waypoints further comprises transmitting a group of in-flight waypoints to the unmanned vehicle, the group of in-flight waypoints including a quantity being less than or equal to the quantity of the plurality of initial waypoints in which the unmanned vehicle has previously arrived.

17. The method of claim 16, wherein transmitting a group of in-flight waypoints to the unmanned vehicle further comprises transmitting a group of in-flight waypoints comprising at least one recursive waypoint and at least one new waypoint.

18. The method of claim 16, wherein transmitting a group of in-flight waypoints to the unmanned vehicle further comprises transmitting a sub-route to the unmanned vehicle.

19. The method of claim 18, wherein transmitting a sub-route to the unmanned vehicle further comprises transmitting a sub-route that is at least one of an approach route, a loiter route, and a vector route to the unmanned vehicle.

20. The method of claim 14, wherein transmitting a plurality of initial waypoints and one or more in-flight waypoints further comprises transmitting a plurality of initial waypoints and one or more in-flight waypoints using a STANdardization AGreement 4586 protocol.

\* \* \* \* \*

UNITED STATES PATENT AND TRADEMARK OFFICE
CERTIFICATE OF CORRECTION

PATENT NO. : 8,948,932 B2  
APPLICATION NO. : 11/929555  
DATED : February 3, 2015  
INVENTOR(S) : Yeager et al.

Page 1 of 1

It is certified that error appears in the above-identified patent and that said Letters Patent is hereby corrected as shown below:

Title Page

On page 2, in column 1, Item (56) under "Other Publications", line 22, delete "2008318929." and insert --2008318929,--, therefor On page 2, in column 1, Item (56) under "Other Publications", line 30, delete "200880114258,7," and insert --200880114258.7,--, therefor On page 2, in column 2, Item (56) under "Other Publications", line 1, delete "200880114258,7," and insert --200880114258.7,--, therefor On page 2, in column 2, Item (56) under "Other Publications", line 14, delete "088452828," and insert --08845282.6,--, therefor Signed and Sealed this  
Thirty-first Day of May, 2016

Michelle K. Lee  
*Director of the United States Patent and Trademark Office*